(12) United States Patent
Ito et al.

(10) Patent No.: US 12,096,124 B2
(45) Date of Patent: Sep. 17, 2024

(54) SUBJECT TRACKING DEVICE, SUBJECT TRACKING METHOD, AND STORAGE MEDIUM

(71) Applicant: CANON KABUSHIKI KAISHA, Tokyo (JP)

(72) Inventors: Yoshie Ito, Chiba (JP); Masato Sanno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/148,630

(22) Filed: Dec. 30, 2022

(65) Prior Publication Data

US 2023/0134895 A1    May 4, 2023

Related U.S. Application Data

(63) Continuation of application No. 17/178,505, filed on Feb. 18, 2021, now Pat. No. 11,553,136.

(30) Foreign Application Priority Data

Feb. 19, 2020    (JP) ................. 2020-026409
Apr. 24, 2020    (JP) ................. 2020-077284

(51) Int. Cl.
*G06V 40/20*    (2022.01)
*H04N 23/61*    (2023.01)
(Continued)

(52) U.S. Cl.
CPC ........ *H04N 23/695* (2023.01); *H04N 23/61* (2023.01); *H04N 23/69* (2023.01)

(58) Field of Classification Search
CPC ........... H04N 5/23299; H04N 5/23218; H04N 5/23296; G06B 40/20
See application file for complete search history.

(56) References Cited

U.S. PATENT DOCUMENTS

| | | |
|---|---|---|
| 8,253,819 B2 | 8/2012 | Ishii et al. |
| 9,158,974 B1 | 10/2015 | Laska et al. |
| (Continued) | | |

FOREIGN PATENT DOCUMENTS

| | | | | |
|---|---|---|---|---|
| CN | 110264497 A | * | 9/2019 | ............. G06T 7/248 |
| JP | 2010-056692 A | | 3/2010 | |
| (Continued) | | | | |

OTHER PUBLICATIONS

A Feb. 1, 2022 Japanese Office Action, which is enclosed, that issued in Japanese Patent Application No. 2020-077284.

*Primary Examiner* — Patrick E Demosky
(74) *Attorney, Agent, or Firm* — Cowan, Liebowitz & Latman, P.C.

(57) ABSTRACT

In order to provide a subject tracking device capable of reducing erroneous tracking of a subject, the subject tracking device includes an image acquisition unit configured to sequentially acquire images, a tracking unit configured to track a subject which is detected from the images acquired by the image acquisition unit by comparison between images over a plurality of images which are sequentially acquired by the image acquisition unit, and a switching unit configured to switch a time for continuing tracking in the tracking unit in accordance with a type of the subject detected from the images.

27 Claims, 7 Drawing Sheets

(51) Int. Cl.
*H04N 23/69* (2023.01)
*H04N 23/695* (2023.01)

(56) References Cited

U.S. PATENT DOCUMENTS

| | | |
|---|---|---|
| 9,479,692 B2 | 10/2016 | Kodama |
| 9,620,168 B1* | 4/2017 | Townsend ................. G06T 7/90 |
| 2008/0316328 A1 | 12/2008 | Steinberg et al. |
| 2009/0303342 A1 | 12/2009 | Corcoran et al. |
| 2011/0001840 A1 | 1/2011 | Ishii et al. |
| 2013/0329106 A1 | 12/2013 | Bigioi et al. |
| 2018/0027172 A1* | 1/2018 | Akaguma ............ H04N 23/611 |
| | | 348/345 |
| 2018/0349708 A1* | 12/2018 | van Hoof ......... G08B 13/19684 |
| 2021/0256711 A1* | 8/2021 | Yachida .................... G06T 7/20 |

FOREIGN PATENT DOCUMENTS

| | | |
|---|---|---|
| JP | 2012-080251 A | 4/2012 |
| JP | 2017-126915 A | 7/2017 |
| WO | 2009/098894 A | 8/2009 |

* cited by examiner

FIG. 2

SUBJECT TRACKING DEVICE, SUBJECT TRACKING METHOD, AND STORAGE MEDIUM

CROSS-REFERENCE TO RELATED APPLICATIONS

This application is a continuation of application Ser. No. 17/178,505, filed Feb. 18, 2021, the entire disclosure of which is hereby incorporated by reference.

FIELD OF THE INVENTION

The present invention relates to a subject tracking device capable of tracking a subject in a plurality of images, and the like.

DESCRIPTION OF THE RELATED ART

Since recent years, most imaging devices such as digital cameras have been able to detect a subject in real time during live view or the like, and to continue a tracking operation even when the subject moves while distinguishably displaying the region of the detected subject on an operation screen. The tracked subject (region) is often a main subject that is a target for focusing in autofocus (AF).

In order to detect the position of a subject which is a target for such AF in real time, Japanese Patent Laid-Open No. 2012-80251 performs subject tracking based on template matching. In addition, a configuration in which a tracking period is calculated on the basis of a reliability representing the similarity to a subject that is a target for tracking and subject tracking is performed on the basis of the tracking period is disclosed.

In addition, in Japanese Patent Laid-Open No. 2012-80251, erroneous tracking is prevented by providing a tracking period on the basis of a reliability representing the similarity to a subject.

However, in a configuration such as that in Japanese Patent Laid-Open No. 2012-80251, for example, even if the reliability representing the similarity to a subject is high, it may be difficult to perform tracking due to a small feature amount of the subject itself, and thus there is a possibility of erroneous tracking being frequently caused within a tracking period.

In addition, erroneous tracking of a pupil has a tendency to occur in animals having patterns resembling the pupil all over their bodies (such as, for example, a Dalmatian dog).

Consequently, an object of the present invention is to provide an imaging device capable of reducing erroneous tracking of a subject.

SUMMARY OF THE INVENTION

In order to achieve the above object, according to an aspect of the present invention, there is provided an imaging device including:
  an image acquisition unit configured to sequentially acquire images;
  a tracking unit configured to track a subject which is detected from the images acquired by the image acquisition unit by comparison between images over a plurality of images which are sequentially acquired by the image acquisition unit; and
  a switching unit configured to switch a time for continuing tracking in the tracking unit in accordance with a type of the subject detected from the images.

Further features of the present invention will become apparent from the following description of Embodiments with reference to the attached drawings.

BRIEF DESCRIPTION OF THE DRAWINGS

FIG. 2 is a diagram illustrating an arrangement example of imaging pixels and focus detection pixels of Embodiment 1.

DESCRIPTION OF THE EMBODIMENTS

Hereinafter, preferred Embodiments of the present invention will be described with reference to the accompanying drawings. Meanwhile, in each drawing, the same members or elements are denoted by the same reference numbers, and thus description thereof will be omitted or simplified.

In addition, in the Embodiments, an example in which an imaging device is as a digital still camera will be described. However, examples of the imaging device include an electronic device having an imaging function such as a digital movie camera, a smartphone with a camera, a tablet computer with a camera, a vehicle-mounted camera, or a network camera, and the like.

Embodiment 1

Hereinafter, Embodiment 1 of the present invention will be described with reference to the accompanying drawings.

Figure 1:
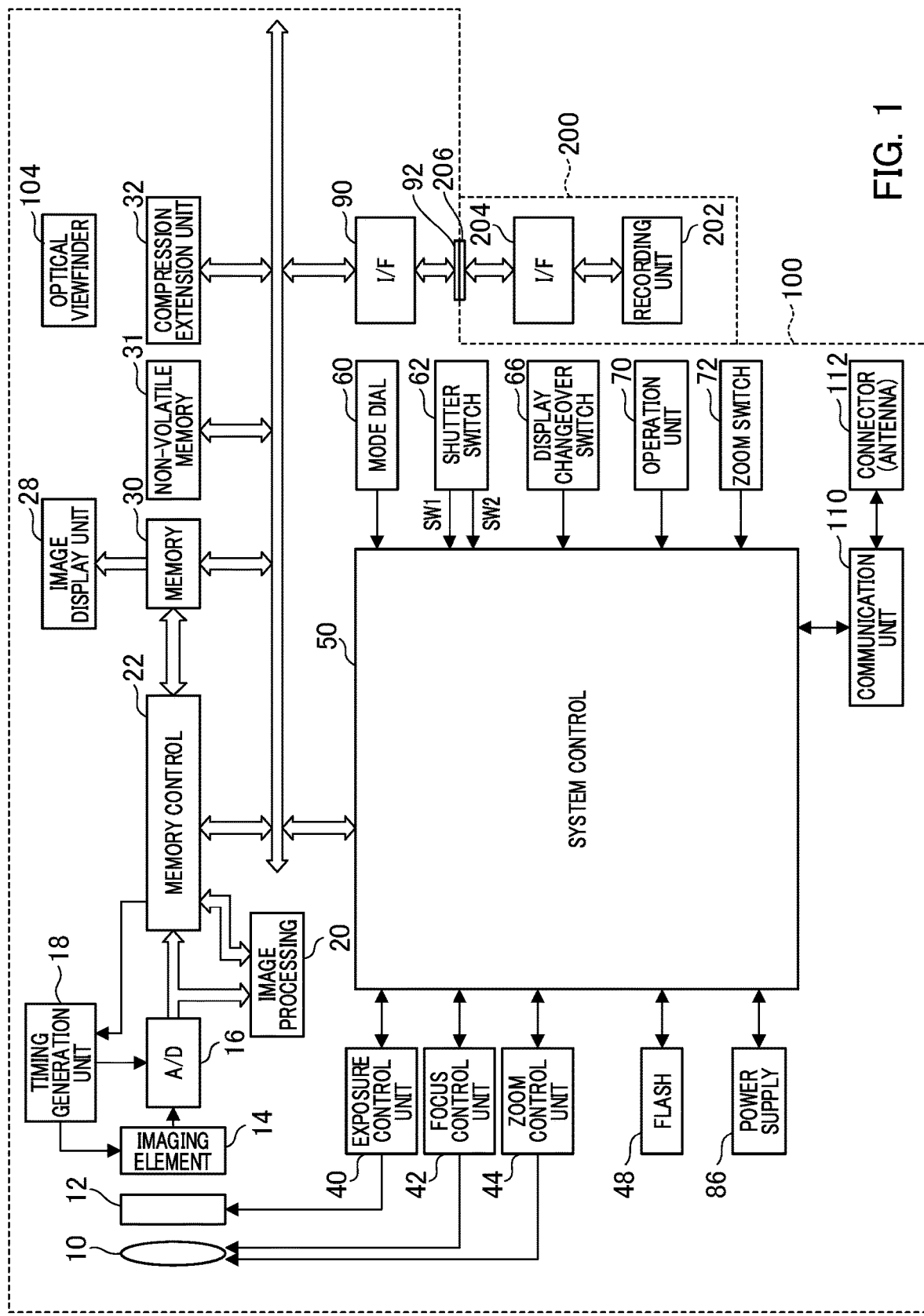
FIG. 1 is a block diagram illustrating a configuration of Embodiment 1 of the present invention.

FIG. 1 is a block diagram illustrating a configuration of Embodiment 1 of the present invention.

In FIG. 1, the reference number 100 denotes an imaging device (a subject tracking device), the reference number 10 denotes an imaging lens, and the reference number 12 denotes a mechanical shutter having a diaphragm function. The reference number 14 denotes an imaging element such as a CMOS sensor that converts an optical image into an electrical signal, and functions as an image acquisition unit configured to sequentially acquire images of a subject. In addition, the reference number 16 denotes an A/D converter that converts an analog signal output which is output from the imaging element 14 into a digital signal.

The reference number 18 denotes a timing generation unit that supplies a clock signal or a control signal to the imaging element 14 or the A/D converter 16, and is controlled by a memory control circuit 22 and a system control circuit 50.

A charge accumulation time can be controlled by the timing generation unit 18 controlling a reset timing of the imaging element 14, and the timing generation unit can be used as an electronic shutter in moving image capturing or the like separately from the mechanical shutter 12.

Meanwhile, the system control circuit 50 has a CPU as a computer built-in, and functions as a control unit configured to execute various operations of the entire device on the basis of a computer program stored in a non-volatile memory 31.

The reference number 20 denotes an image processing circuit that performs a pixel interpolation process, a color conversion process, a denoising process, an edge enhancement process, or the like for image enlargement/reduction on data from the A/D converter 16 or data from the memory control circuit 22.

In addition, the image processing circuit 20 functions as a detection unit configured to detect a specific subject from an image.

In addition, the image processing circuit 20 has a face detection function of detecting a person, an animal, or a face region, a function of detecting organs (parts) of a face such as pupils, a nose, or a mouth, a whole body detection function of detecting the whole body (the whole object) of a subject, or the like through image recognition. A process of calculating the position of a face, an organ, or the whole body from the results of face detection, organ detection, or whole body detection, or the like is performed.

In the face detection or the whole body detection in the image processing circuit 20, the shape of the contour portion of a face or the whole body is stored as feature data in the image processing circuit 20, and an image region consistent with the feature data within an image to be detected is specified by a pattern matching process. In the face detection, an image region consistent with the feature data indicating the shape of a face stored in the image processing circuit 20 in advance is specified by the pattern matching process within a region obtained by the whole body detection.

In addition, the degree of matching with the feature data stored in the image processing circuit 20 is calculated, and a region in which the degree of matching is equal to or greater than a predetermined value is defined as a region of a face or the whole body.

In addition, in order to increase a chance of detecting a face or the whole body and improving the accuracy of detection, the pattern matching process is performed using a plurality of pieces of feature data stored in the image processing circuit 20. Meanwhile, the pattern matching process may be performed using feature data of only a portion of the shape of a face or the whole body. In addition, the pattern matching process may be performed by changing the size of feature data in order to detect a face or the whole body regardless of the size thereof.

In the organ detection, an image region consistent with the feature data indicating the shape of an organ stored in the image processing circuit 20 in advance is specified by the pattern matching process within a region obtained by the face detection.

As another detection method, detection based on deep learning can also be performed. The image processing circuit 20 includes a plurality of product-sum operation units, and is also used as a processor that performs a deep learning process.

The image processing circuit 20 applies a subject detection process to image data using one learning model selected by the system control circuit 50 among a plurality of learning models stored in the non-volatile memory 31 to be described later.

In addition, the image processing circuit 20 may switch learning models stored in the non-volatile memory 31 to perform multiple types of detecting processes on one piece of image data.

For example, the non-volatile memory 31 stores three learning models, that is, a learning model capable of detecting parts such as the pupil, face, or whole body of a dog and a cat, a learning model capable of detecting parts such as the pupil, face, or whole body of a bird, and a learning model capable of detecting vehicles such as a train and a car.

The system control circuit 50 uses one of the three learning models to perform a process of detecting an image on the basis of the learning model in the image processing circuit 20.

The system control circuit 50 uses the three learning models to detect one image three times, and thus it is possible to detect parts such as the pupil, face, or whole body of a dog and a cat, parts such as the pupil, face, or whole body of a bird, and vehicles such as a train and a car.

Meanwhile, in the present Embodiment, although parts such as the pupil, face, or whole body of a dog and a cat, parts such as the pupil, face, or whole body of a bird, and vehicles such as a train and a car are detected, subjects to be detected are not limited thereto.

In addition, insofar as a subject can be detected, methods other than the method shown in the present Embodiment may be used.

The image processing circuit 20 also performs a tracking process between images such as images in live view. If the image processing circuit 20 detects a subject, it temporarily stores an image of a region of the detected subject as a template in a memory 30.

In addition, the image processing circuit 20 searches for a region that matches a template temporarily stored in the memory 30 from among images generated during live view on the basis of template information temporarily stored in the memory 30, and performs a subject tracking process on the matched region as a subject region.

As a method in which the image processing circuit 20 searches for a region that matches a template temporarily stored in the memory 30, there is a method in which an image is cut out for each region and the absolute value of a difference from the template temporarily stored in the memory 30 is taken to define a region with a small difference as a subject region.

In addition, although there is a method of acquisition from the degree of matching between the template temporarily stored in the memory 30 and a histogram, color data, or the like, another method may be used insofar as a region that matches the template temporarily stored in the memory 30 can be specified from among images.

In this manner, in the present Embodiment, the image processing circuit 20 functions as a tracking unit configured to track a specific subject (at least one part thereof) detected from an image by comparison between images over a plurality of images which are sequentially acquired by the image acquisition unit. Meanwhile, the above tracking unit may be configured inclusive of the system control circuit 50. Meanwhile, the tracking unit performs tracking on the basis of a subject region corresponding to a specific subject (a part thereof) detected by the detection unit.

Meanwhile, if a specific subject (part) is not detected by the detection unit, the specific subject (part) continues to be tracked with reference to a subject region in an image in which the specific subject (part) is detected. This will be described later with reference to FIG. 4.

If there are a plurality of detected subjects, the system control circuit 50 determines a main subject from a subject selected by a user, the size of the subject, or its position on the screen, and sets the region of the main subject as a focus detection region to be described later.

The system control circuit 50 switches to the subject tracking process using the image processing circuit 20 when a subject detected during live view cannot be detected, and sets the subject region obtained in the subject tracking process as a focus detection region. By performing the subject tracking process, it is possible to perform focus detection on the part of the same subject for a longer period of time to continue to focus on the subject.

The system control circuit 50 executes a focus detection process if the part of the same subject can be detected within a tracking continuation time to be described later, and sets another part of the same subject or another type of subject as a main subject (focus detection region) in accordance with the flow shown in FIG. 4 if tracking cannot be performed.

Figure 3A:
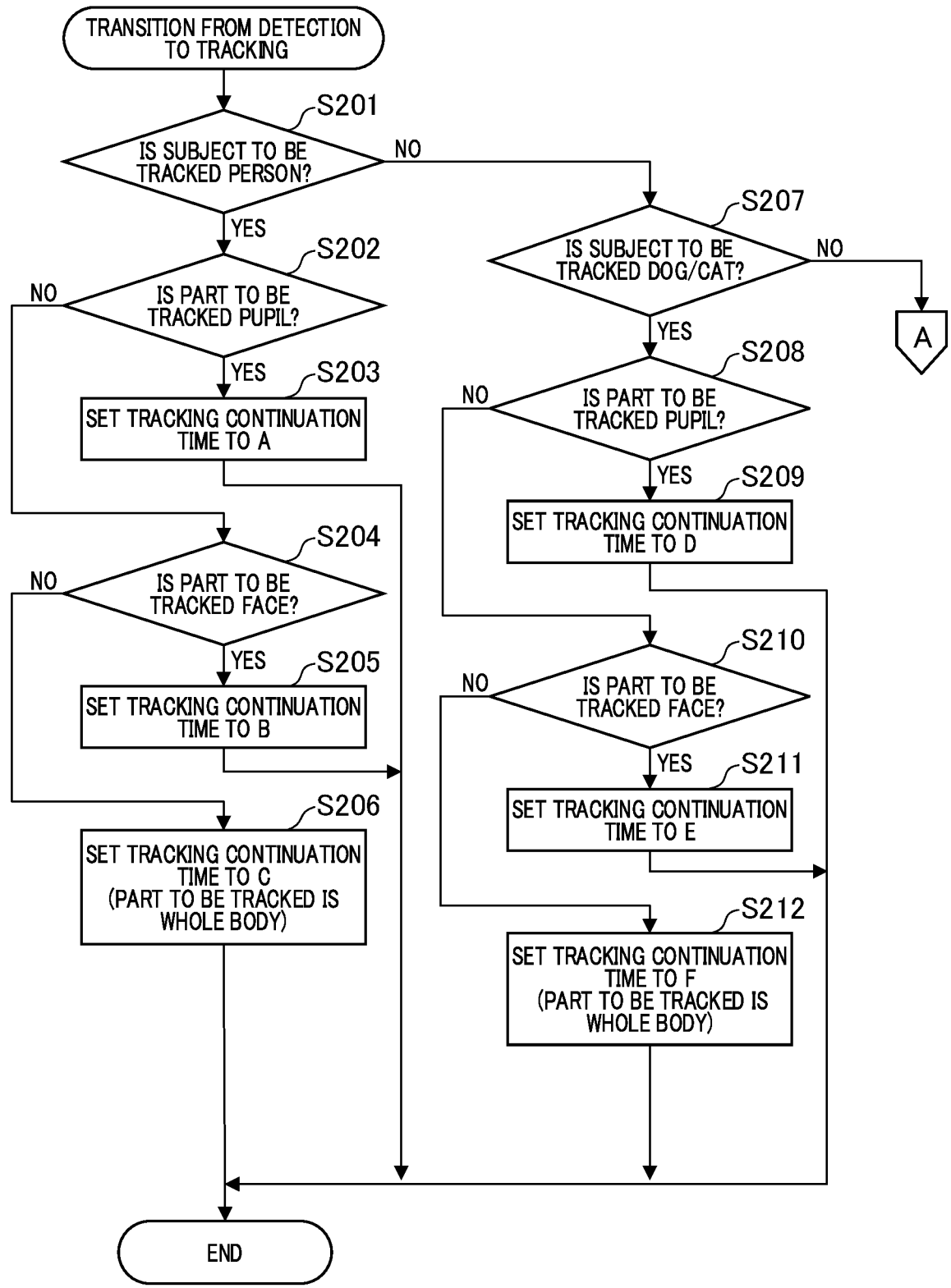
FIG. 3A is a flow chart illustrating operations for setting a tracking continuation time of Embodiment 1.
Figure 3B:
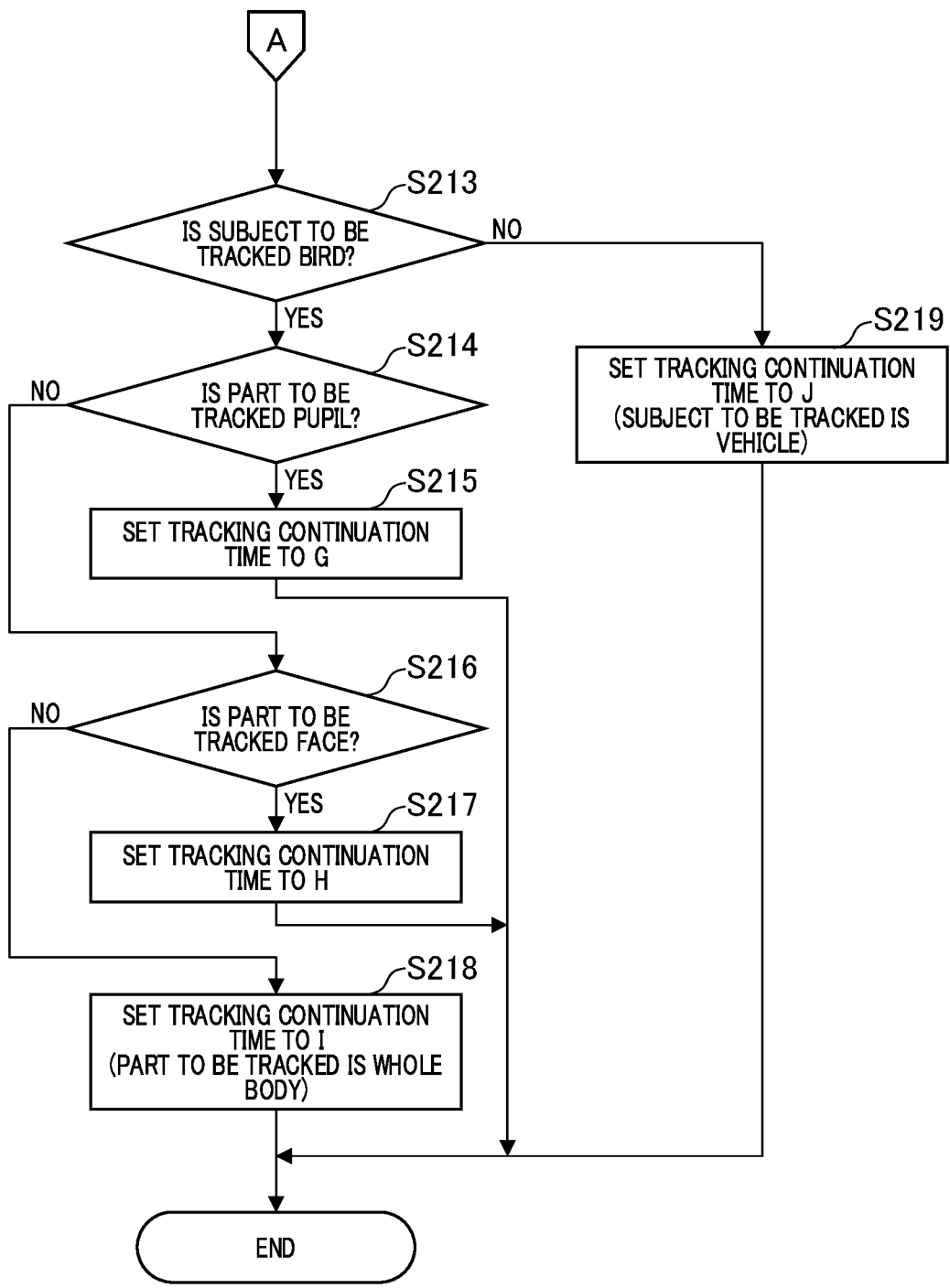
FIG. 3B is a flow chart illustrating another operations for setting a tracking continuation time of Embodiment 1.
Figure 4:
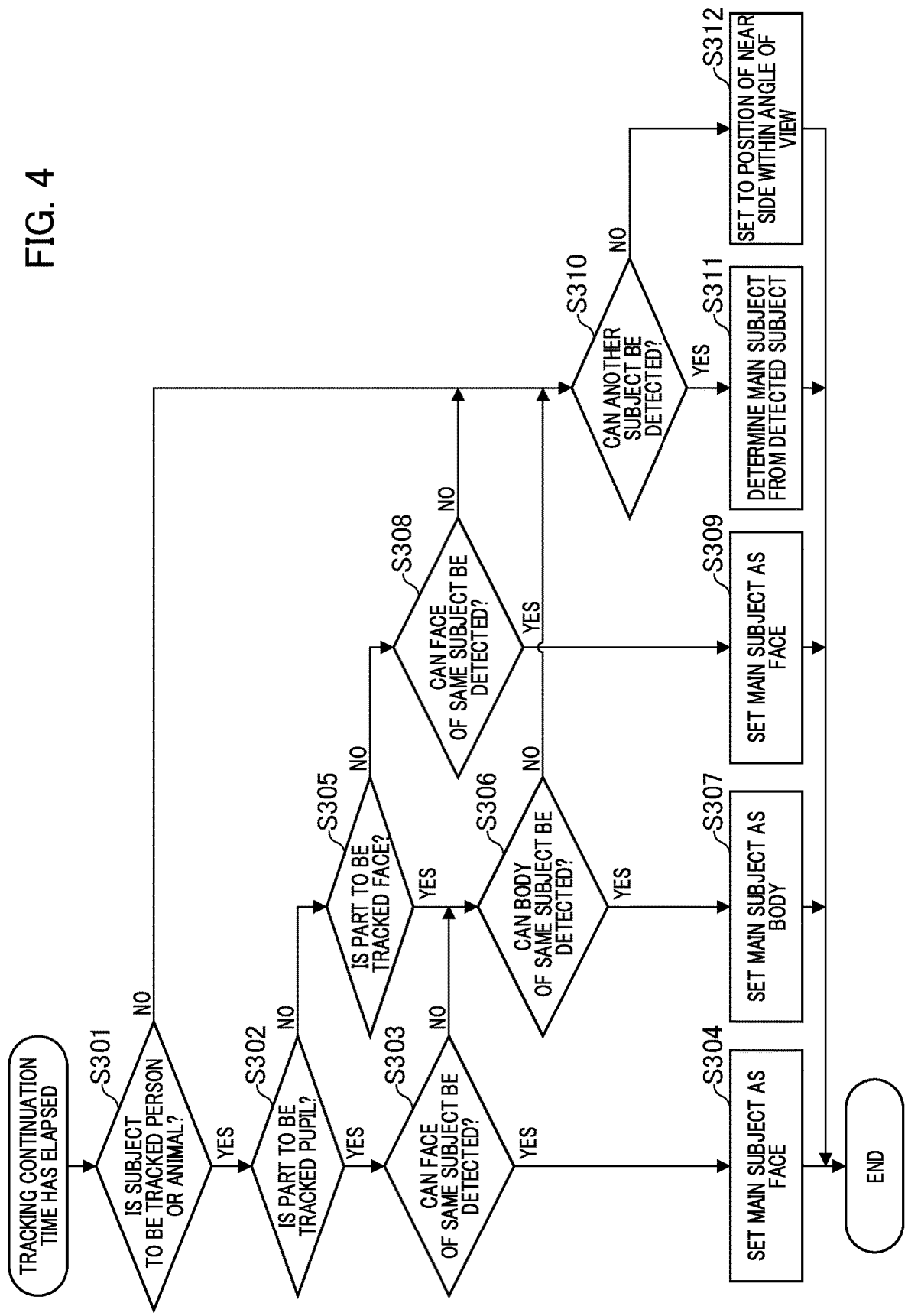
FIG. 4 is a flow chart illustrating operations after the tracking continuation time of Embodiment 1 has elapsed.

That is, if a time for which the part of the same subject continues to be tracked runs beyond a tracking continuation period shown in FIG. 3, the system control circuit 50 sets a focus detection region with another part of the same subject or a different type of subject as a main subject as shown in FIG. 4.

In addition, in the image processing circuit 20, a predetermined arithmetic operation process is performed using captured image data in order to perform an auto white balance (hereinafter referred to as AWB) process. In addition, the obtained arithmetic operation result is calculated as a white balance (hereinafter referred to as WB) evaluation value. In addition, the color of image data is also converted on the basis of the calculated WB evaluation value, or the like.

Further, in the image processing circuit 20, a predetermined arithmetic operation process is performed using captured image data in order to calculate an AE evaluation value and an EF evaluation value for performing an automatic exposure control (hereinafter referred to as AE) process and a strobe exposure control (hereinafter referred to as EF) process.

Based on the obtained AE evaluation value and EF evaluation value, the system control circuit 50 controls an exposure control unit 40 or a flash 48 in accordance with a predetermined algorithm.

The reference number 22 denotes a memory control circuit, and controls the A/D converter 16, the timing generation unit 18, the image processing circuit 20, the memory 30, a compression extension unit 32, or the like.

Data of the A/D converter 16 is written in the memory 30 through the image processing circuit 20 and the memory control circuit 22, or data of the A/D converter 16 is written in the memory 30 directly through the memory control circuit 22.

The reference number 28 denotes an image display unit composed of an LCD or the like, and image data for display written in the memory 30 is displayed by the image display unit 28 on the basis of control performed by the memory control circuit 22.

An electronic viewfinder function can be realized by sequentially displaying captured image data using the image display unit 28.

In addition, the image display unit 28 can turn display on/off according to the instruction of the system control circuit 50, and thus it is possible to considerably reduce the power consumption of the imaging device 100 if display is turned off.

The reference number 30 denotes a memory for temporarily storing a still image or a moving image which is captured, and has a sufficient amount of storage to store a predetermined number of still images or a moving image of a predetermined period of time.

Thereby, even in the case of continuous shooting of continuously capturing a plurality of still images, a high rate and large volume of image writing can be performed on the memory 30.

In addition, the memory 30 can also be used as a region for temporarily storing feature data for authentication or a work area of the system control circuit 50.

The reference number 31 denotes a non-volatile memory constituted by a flash ROM or the like. A program code (computer program) which is executed by the system control circuit 50 is written in the non-volatile memory 31, and the system control circuit 50 executes various processes while sequentially reading out the program code.

In addition, a region for storing feature data of a face for authentication as dictionary data, a region for storing system information, and a region for storing user setting information are provided in the non-volatile memory 31, thereby allowing various types of information or settings to be read out and restored at the time of startup.

The reference number 32 denotes a compression extension unit that compresses and extends image data through an adaptive discrete cosine transform (ADCT) or the like, the compression extension unit reading an image stored in the memory 30, performing a compression process or an extension process, and rewriting processed data in the memory 30.

The reference number 40 denotes an exposure control unit that controls the mechanical shutter 12 having a diaphragm function, and can also control flash dimming performed by the flash 48.

The reference number 42 denotes a focus control unit that controls focusing of the imaging lens 10, and the reference number 44 denotes a zoom control unit that controls zooming of the imaging lens 10. The reference number 48 denotes a flash that has a flash dimming function.

Meanwhile, the system control circuit 50 controls the exposure control unit 40 and the focus detection control unit 42 on the basis of the arithmetic operation result obtained by the image processing circuit 20 arithmetically operating the captured image data.

The system control circuit 50 also performs autofocus (hereinafter referred to as AF) processing on the basis of pixel data for phase difference detection obtained from the imaging element 14. The term "AF" referred to here indicates automatic focus detection in which a main subject region selected by a user or a main subject region automatically set by a camera is set as a focus detection region and a focus position is automatically detected.

The imaging element 14 is constituted by a C-MOS sensor and its peripheral circuits, has a pixel array of m horizontal and n vertical, and has one photoelectric conversion element disposed in each pixel.

The imaging element 14 is configured to be capable of outputting independent signals from all the pixels. In addition, some pixels out of all the pixels are focus detection pixels that enable AF of an imaging surface phase difference detection system (imaging surface phase difference AF).

Figure 2:
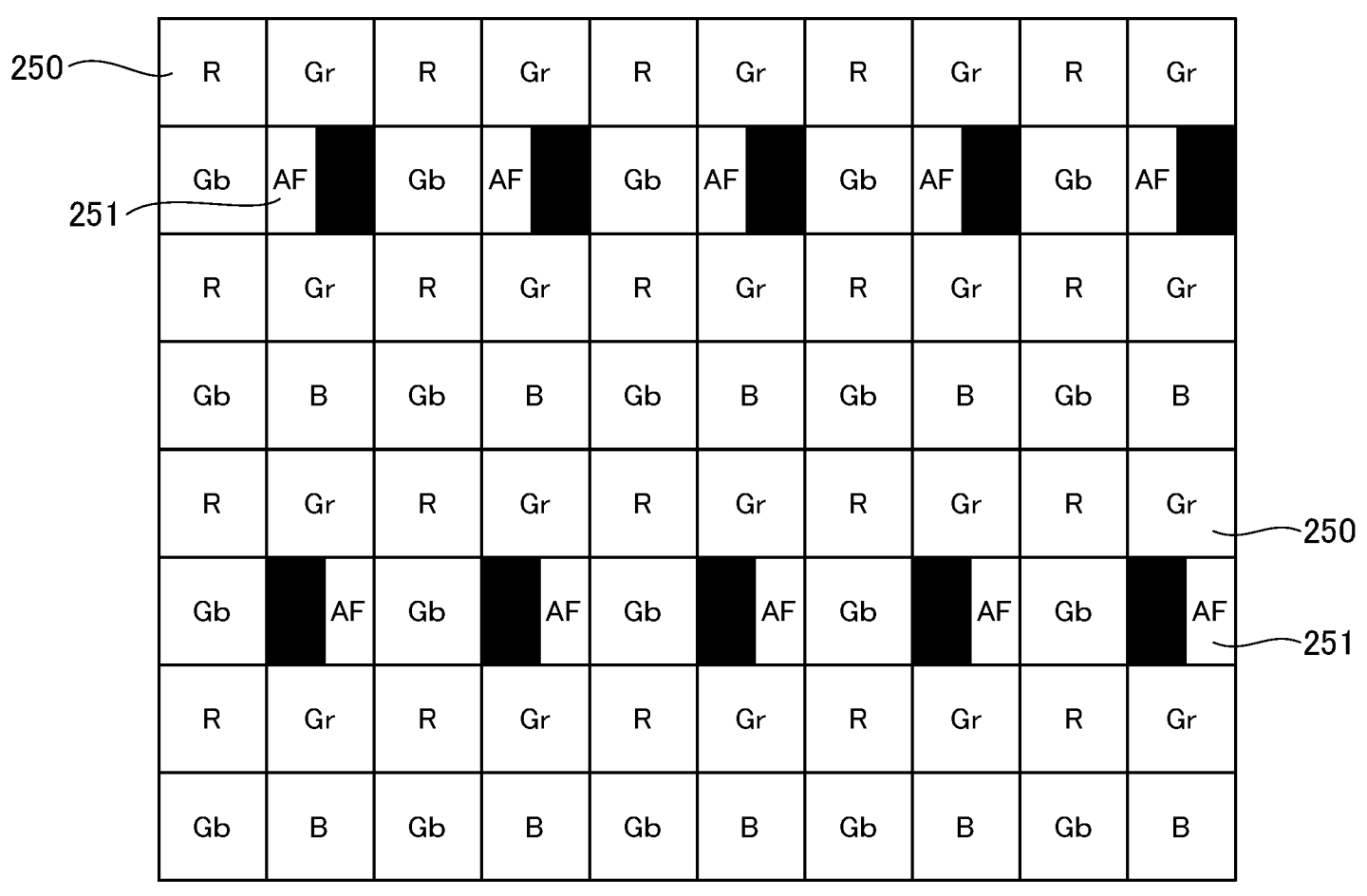

Specifically, as shown in FIG. 2, the imaging element 14 is configured such that a plurality of focus detection pixels 251 are dispersedly disposed in imaging pixels 250. FIG. 2 is a diagram illustrating an arrangement example of imaging pixels and focus detection pixels of Embodiment 1.

In addition, each of the plurality of focus detection pixels 251 is configured to receive a light flux passing through one of regions of a pair of different exit pupils of an imaging optical system.

The imaging pixel 250 receives a light flux passing through the entire region of the exit pupil of the imaging optical system that forms an image of a subject to generate an image of the subject.

In addition, for example, color filters of a Bayer array are disposed on the front of the imaging pixel 250.

In addition, in the example of FIG. 2, the imaging element 14 is configured such that a pair of G pixels (a Gr pixel and a Gb pixel) diagonally disposed among pixels of 2 rows×2 columns belonging to first and second rows are formed as imaging pixels, and that a B pixel is replaced with a focus detection pixel. Pixels of 2 rows×2 columns belonging to fifth and sixth rows also have the same configuration.

The system control circuit 50 performs a focus detection process in a phase difference AF system on the basis of the imaging signal of focus detection pixels discretely disposed in the imaging element 14. That is, a pair of image signals are formed from a plurality of focus detection pixels by a light flux passing through a pair of pupil regions of the imaging optical system. A focus detection pixel group of the second row in FIG. 2 forms, for example, a right-eye image signal, and a focus detection pixel group of the sixth row in FIG. 2 forms, for example, a left-eye image signal.

The amount of shift of the pair of images is acquired by performing the correlation operation of the pair of image signals. Since the amount of shift changes in accordance with a distance to a subject, the focus detection is performed on the basis of the amount of shift.

Although the imaging surface phase difference AF is realized by replacing a portion of an imaging pixel array disposed on an imaging surface with the focus detection pixel 251 in the present Embodiment, the present invention is not limited to this system, and may have any configuration insofar as the focus detection is possible.

For example, the focus detection may be performed by known phase-difference-type focus detection using a focus detection dedicated sensor or known contrast-type focus detection.

The components represented by the reference numbers 60, 62, 66, 70 and 72 constitute an operation unit for inputting various operation instructions of the system control circuit 50, and are composed of one or a plurality of combinations of a switch, a dial, a touch panel, pointing based on visual line detection, a voice recognition device, and the like.

The reference number 60 denotes a mode dial that can switch and set function modes such as power off, an automatic image capturing mode, an image capturing mode, a panoramic image capturing mode, a moving image capturing mode, a reproduction mode, and a PC connection mode.

The reference number 62 denotes a two-stroke (SW1, SW2) shutter switch, in which the SW1 is turned on while the shutter switch 62 is being pressed, and operations such as an autofocus (AF) process, an automatic exposure (AE) process, and an auto white balance (AWB) process are started.

If the shutter switch 62 is pressed to the end, the shutter switch SW2 is turned on and still image capturing is started. In the case of flash shooting, pre-flash processing for EF is performed, and then the mechanical shutter 12 is brought into operation to expose the imaging element 14 for an exposure time determined in AE processing.

A flash is emitted during this exposure period and the mechanical shutter 12 is shielded from light by the exposure control unit 40 with the end of the exposure period, to thereby end the exposure to the imaging element 14.

A signal which is read out from the imaging element 14 is written as image data in the memory 30 through the A/D converter 16 and the memory control circuit 22, and a development process using an arithmetic operation in the image processing circuit 20 or the memory control circuit 22 is performed. In addition, the image data is read out from the memory 30, and compressed by the compression extension unit 32.

Thereafter, a recording process of writing the image data in a recording medium 200 is performed, and a series of operations of still image shooting and the recording process are performed by turning on the shutter switch SW2.

The reference number 66 denotes a display changeover switch, and can change over display (ON/OFF changeover) of the image display unit 28. With this function, when image capturing is performed using an optical viewfinder 104, power saving can be achieved by turning off the image display unit 28 composed of an LCD or the like.

The reference number 70 denotes an operation unit composed of various buttons, a touch panel, a rotary dial, or the like, and includes a menu button, a set button, a macro button, a multi-screen reproduction page break button, a flash setting button, a single shooting/continuous shooting/ self timer switch button, or the like.

In addition, the operation unit 70 also includes a menu shift+(plus) button, a menu shift−(minus) button, a reproduction image shift+(plus) button, a reproduction image− (minus) button, a captured image quality selection button, an exposure correction button, a date/time setting button, or the like.

The reference number 72 denotes a zoom switch that is a zoom operation unit for a user to give an instruction for changing the magnification of a captured image. The zoom switch 72 includes a tele-switch that changes the imaging angle of view to the tele side and a wide switch that changes it to the wide-angle side.

By using the zoom switch 72, it serves as a trigger for instructing the zoom control unit 44 to change the imaging angle of view of the imaging lens 10 and performing an optical zoom operation. In addition, in the case of arrival at the optical zoom end, it also serves as a trigger for cutting out an image by the image processing circuit 20 or electronically changing the zooming of the imaging angle of view through a pixel interpolation process or the like.

The reference number 86 denotes a power supply unit composed of a primary battery, a secondary battery, an AC adapter, or the like.

The reference number 90 denotes an interface with the recording medium 200 such as a memory card or a hard disk, and the reference number 92 denotes a connector for performing electrical connection to the recording medium 200.

The reference number 104 denotes an optical viewfinder, which is provided separately from the image display unit 28 and makes it possible to perform image capturing using only an optical viewfinder.

The reference number 110 denotes a communication unit having a built-in GPS receiver that receives radio waves for GPS through a connector 112 to acquire position information.

The reference number 200 denotes a recording medium, and includes a recording unit 202 constituted by a semiconductor memory, a magnetic disk, or the like, an interface 204 with the imaging device 100, and a connector 206 for performing electrical connection to the imaging device 100.

In the above-described configuration, depending on the type of a subject to be tracked, it may be difficult to track the subject due to a reason such as a small feature amount in an image that may result in erroneous tracking of another subject.

In the present Embodiment, in order to reduce such erroneous tracking, a tracking continuation period is changed in accordance with the type of subject or its part.

Next, FIG. 3 is a flow chart illustrating operations for setting a tracking continuation time of Embodiment 1, and a method of determining a tracking continuation period which is performed by the system control circuit 50 will be described with reference to FIG. 3.

In FIG. 3, when the system control circuit 50 determines that a subject detected during live view cannot be detected and switches to a tracking process, the system control circuit 50 switches the tracking continuation time while performing a tracking operation.

Here, the system control circuit 50 functions as a switching unit configured to switch the tracking continuation time (time for continuing tracking) in accordance with the type of subject or the part of the subject detected from an image.

In step S201, it is determined whether a subject to be tracked is a person. That is, the type of subject is determined. The process transitions to step S207 if the subject is not a person, and the process transitions to step S202 if the subject is a person.

In step S202, it is determined whether a part to be tracked is either the right or left pupil of a person. That is, it is determined whether the part of the subject is a pupil, the process transitions to step S203 if the part to be tracked is determined to be a pupil, and the process transitions to step S204 if it is not determined to be a pupil.

In step S203, the tracking continuation time is set to A to end the process.

In step S204, it is determined whether the part to be tracked is a face including the back of the head of a person. That is, it is determined whether the part of the subject is a face, the process transitions to step S205 if it is determined to be a face, the tracking continuation time is set to B to end the process, and the process transitions to step S206 if it is not determined to be a face.

In step S206, the part to be tracked is regarded as the whole body of a person and the tracking continuation time is set to C to end the process.

Here, the times A, B, and C to be set as the tracking continuation time are determined in accordance with the general feature amount of each part of a person. That is, since the relation of the feature amount of the whole body>the feature amount of a face>the feature amount of a pupil is generally established, the tracking continuation time is set to C>B>A.

In step S207, it is determined whether the subject to be tracked is a dog, a cat, or the like. That is, it is determined whether the type of subject is a dog, a cat, or the like, the process transitions to step S208 if the subject to be tracked is a dog, a cat, or the like, and the process transitions to step S213 in other cases.

In step S208, it is determined whether the part to be tracked is either the right or left pupil. The process transitions to step S209 if the part to be tracked is determined to be a pupil, the tracking continuation time is set to D to end the process, and the process transitions to step S210 if it is not determined to be a pupil in step S208.

In step S210, it is determined whether the part to be tracked is a face including the back of the head of a dog, a cat, or the like, the process transitions to step S211 if it is determined to be a face, the tracking continuation time is set to E to end the process, and the process transitions to step S212 if it is not determined to be a face.

In step S212, the part to be tracked is regarded as the whole body of a dog, a cat, or the like and the tracking continuation time is set to F to end the process.

Here, the times D, E, and F to be set as the tracking continuation time are set as F>E>D which are the order of the general feature amount according to the part of a dog, a cat, or the like. That is, in the case of a dog, a cat, or the like, since the relation of the feature amount of the whole body>the feature amount of a face>the feature amount of a pupil is also generally established, the tracking continuation time is set to F>E>D.

In step S213, it is determined whether the subject to be tracked is a bird. That is, it is determined whether the type of subject is a bird, the process transitions to step S214 if the subject to be tracked is a bird, and the process transitions to step S219 if it is not a bird.

In step S214, it is determined whether the part to be tracked is either the right or left pupil, the process transitions to step S215 if the part to be tracked is determined to be a pupil and the tracking continuation time is set to G to end the process. The process transitions to step S216 if it is not determined to be a pupil in step S214.

In step S216, it is determined whether the part to be tracked is a face including the back of the head of a bird, the process transitions to step S217 if it is determined to be a face, the tracking continuation time is set to H to end the process, and the process transitions to step S218 if it is not determined to be a face.

In step S218, the part to be tracked is regarded as the whole body of a bird and the tracking continuation time is set to I to end the process.

Here, the times G, H, and I to be set as the tracking continuation time are set as I>H>G which are the order of the general feature amount according to the part of a bird. That is, in the case of a bird, since the relation of the feature amount of the whole body>the feature amount of a face>the feature amount of a pupil is also generally established, the tracking continuation time is set to as I>H>G.

In step S219, the subject to be tracked is regarded as a vehicle and the tracking continuation time is set to J to end the process.

Here, the times C, F, I, and J to be set as the tracking continuation time are set as J>C>F>I which are the order of the feature amount according to the type of subject assumed to be large.

That is, since the relation of the feature amount of the whole vehicle>the feature amount of the whole body of a person>the feature amount of the whole body of a dog, a cat, or the like>the feature amount of the whole body of a bird is generally established in descending order of the size of the whole body, the tracking continuation time is set as J>C>F>I. Meanwhile, the tracking continuation time may be set in accordance with the general movement speed of the subject or the like. Alternatively, the tracking continuation time may be set in accordance with an appropriate combination of the size, feature amount, and movement speed of the subject.

Meanwhile, in steps S202, S208, and S214, a determination as to whether a region (part) assumed to have a smaller feature amount than a face region such as, for example, a mouth is being tracked may be replaced for a determination as to whether either the right or left pupil is being tracked.

In addition, the magnitude relation of A, B, C, D, E, F, G, H, I, and J may be changed in accordance with the feature amount of a region (part) to be assumed. In addition, the values of A to J may be manually set by a user, or may be automatically set on the basis of the past learning data using AI.

As described above, in the present Embodiment, the tracking continuation time is switched in accordance with s part (at least one of the whole body, a face, or a pupil) or the type of subject (at least one of a person, a dog, a cat, a bird, or a vehicle).

Further, in the present Embodiment, the tracking continuation time is switched so that a time for continuing the tracking of a part including a predetermined part among the parts of the subject is made longer than a time for continuing the tracking of the inclusion part.

That is, in the same subject, the tracking continuation time is switched so as to make the time for continuing tracking longer as the part becomes larger, and thus it is possible to further reduce erroneous tracking of the subject. In other words, the tracking continuation time is switched so as to makes the time for continuing tracking a relatively large part longer than the time for continuing tracking a relatively small part In addition, in the present Embodiment, the tracking continuation time is switched so as to make the time for continuing tracking longer as the size of the subject for each type becomes larger, and thus it is possible to reduce erroneous tracking of the subject.

Next, in the tracking process, if the system control circuit 50 determines that the tracking cannot be continued, or if the tracking continuation period has elapsed, the system control circuit 50 re-determines a main subject in accordance with FIG. 4.

FIG. 4 is a flow chart illustrating operations after the tracking continuation time of Embodiment 1 has elapsed.

In step S301 of FIG. 4, it is determined whether the tracked subject is a person or an animal. The process transitions to step S302 if the type of subject is a person or an animal, and the process transitions to step S310 in the other cases.

In step S302, the process transitions to step S303 if the part to be tracked is a pupil, and the process transitions to step S305 if it is not a pupil.

In step S303, it is determined whether the face of the same subject as the tracked subject can be detected. If the face part of the same subject can be detected, the process transitions to step S304 and the main subject is set to the face of the same subject to end the flow, and if the face of the same subject cannot be detected, the process transitions to step S306.

In step S305, it is determined whether the part of the subject to be tracked is a face, the process transitions to step S306 if the subject to be tracked is a face, and the process transitions to step S308 if it is not a face.

In step S306, the process transitions to step S307 if the whole body of the same subject as the tracked subject can be detected.

The main subject is set to the whole body of the tracked subject to end the flow, and the process transitions to step S310 if the whole body of the same subject as the tracked subject cannot be detected.

In step S308, the process transitions to step S309 if the face part of the same subject as the tracked subject can be detected. The main subject is set to the face of the tracked subject to end the flow, and the process transitions to step S310 if the face of the same subject as the tracked subject cannot be detected.

In step S310, if a specific subject (part) becomes not being detected in a plurality of images which are sequentially acquired by the image acquisition unit, a subject region (region of the part) in an image in which the specific subject (part) is detected is referred to. If any type (or part) different from the tracked specific subject (part) can be detected in the subject region (region of the part), the process transitions to step S311. In step S311, the subject that can be detected by referring to the subject region (region of the part) is determined as the main subject.

Meanwhile, a method of determining the main subject in step S311 may be determined by the system control circuit 50 from the size of the subject or its position in a screen which can be detected by referring to the subject region (region of the part). For example, there is a method in which weighting is performed on a distance from the center of the angle of view of the main subject and the size of the subject and the part detected in the order of a pupil, a face, and a body is set to the main subject in the case of a person or an animal as a large subject close to the center of the angle of view.

The main subject may be determined by other methods, or the main subject may be determined in accordance with camera settings or scenes determined by the camera. In addition, at that time, the main subject may be determined by a user touching any subject position on a screen.

If another subject cannot be detected in step S310, the process transitions to step S312, and the subject position on the side close to the imaging device within the angle of view is set as a main subject region which is a target for AF. The determination of the position of the near side within the angle of view includes a method of setting a region estimated to be the closest to the imaging sensor using a defocus map, or the like.

In addition, as for a method of setting a subject region if another subject cannot be detected, for example, another method of searching for and determining a region having a relatively conspicuous feature using AI or the like from a region within the angle of view may be taken.

As described above, it is possible to reduce erroneous tracking of the subject by changing the tracking continuation period in accordance with the type of subject or its part and appropriately changing the main subject.

That is, in the present Embodiment, if a time for continuing the tracking of a predetermined part of the subject has elapsed and a part including the predetermined part is detected, the inclusion part is tracked, and thus it is possible to further reduce erroneous tracking of the subject.

Hereinbefore, although the preferred embodiments of the present invention have been described, the present invention is not limited to these embodiments, and can be modified and changed within the scope of the invention.

For example, in the present Embodiment, although the tracking continuation period is changed in accordance with the part or the subject type as an example, the tracking continuation period may be changed in accordance with the size of the subject region to be tracked or the ratio of the subject region to the screen. In that case, if the subject region is large, the tracking continuation period is changed to be long.

In addition, it is determined whether the same or similar part is detected in the vicinity of the region to be tracked, and the tracking continuation period may be changed to be long if the same or similar part is detected in the vicinity of the region to be tracked.

In addition, the edge amount or degree of prominence (for example, contrast) of the subject region to be tracked is calculated, and if the edge amount is large or the degree of prominence is high, the feature amount of the subject is determined to be large and the tracking continuation period may be changed to be long.

Embodiment 2

Meanwhile, erroneous tracking of a pupil has a tendency to occur in animals having patterns resembling the pupil all over their bodies (such as, for example, a Dalmatian dog). In Embodiment 2, in order to reduce such erroneous tracking of a pupil, in a case where the position of the pupil part of the subject is located outside the face region of the subject detected immediately before, a time for continuing tracking is made shorter than in a case where the position is located inside the face region of the subject.

Subsequently, reference will be made to FIGS. 5 and 6 to describe a process method of Embodiment 2 in which the system control circuit 50 changes a tracking continuation time of a pupil on the basis of face detection results and a positional relationship between pupil tracking positions.

Figure 5:
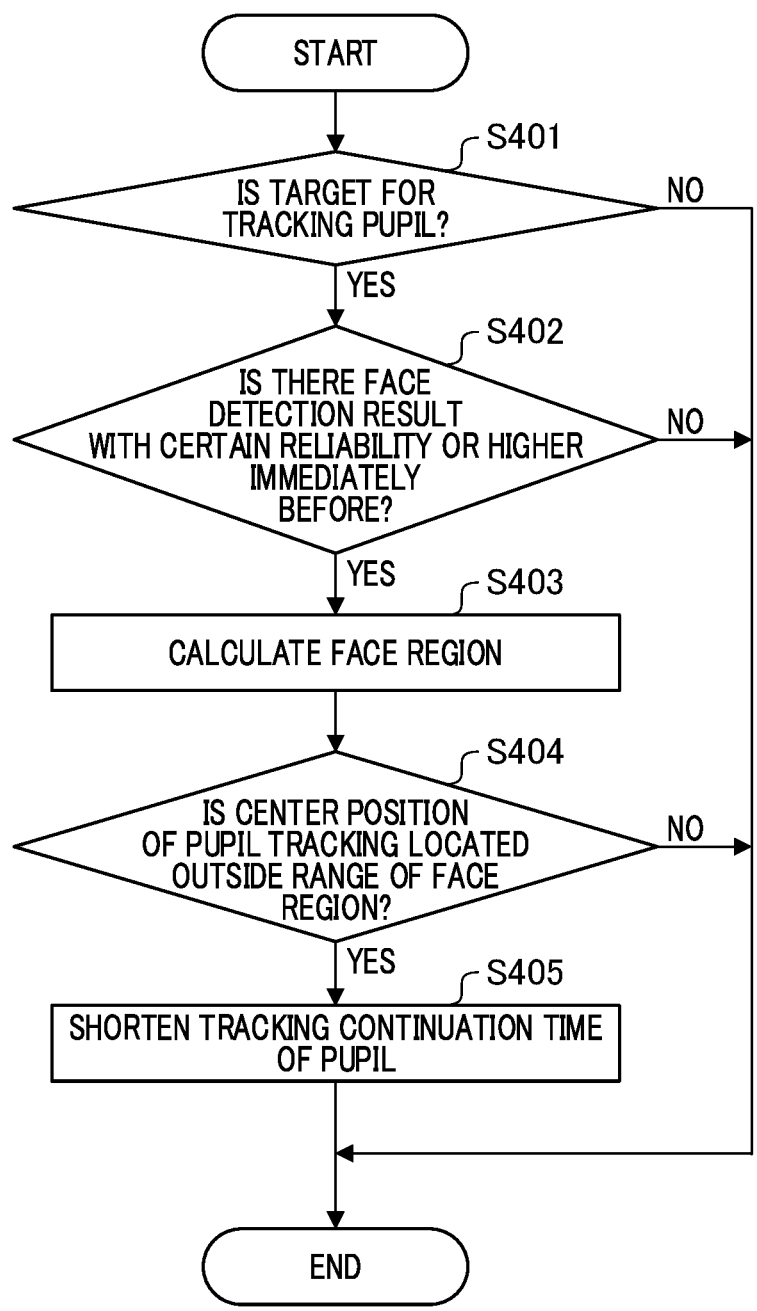
FIG. 5 is a flow chart illustrating operations of a method of reducing erroneous pupil tracking using face detection results of Embodiment 2.

FIG. 5 is a flow chart illustrating operations of a method of reducing erroneous pupil tracking using the face detection results of Embodiment 2.

Meanwhile, the process of FIG. 5 is performed after tracking continuation time setting steps (S203, S209, S215) of a pupil for each subject type of FIG. 3.

In FIG. 5, the system control circuit 50 changes the tracking continuation time on the basis of the pupil tracking position and the face position of the subject detected from an image proximate thereto.

In step S401, it is determined whether the subject to be tracked is a pupil. The process transitions to step S406 if the subject is not a pupil, and the process transitions to step S402 if it is a pupil.

In step S402, it is determined whether a face with more than a certain degree of reliability is detected in a frame immediately before the current tracking frame. The wording "frame immediately before" refers to a frame in which it is expected that the position of the subject does not deviate greatly from the current frame, and specifically indicates a frame within, for example, one frame from the current tracking frame.

In addition, the wording "more than a certain degree of reliability" refers to, for example, a reliability of detecting a face with a correct answer rate of about 80%. The process transitions to step S406 if there is no face detection result with a certain reliability or higher in the immediately preceding frame, and the process transitions to step S403 if there is a face detection result.

In step S403, region extension is performed on the face detection result (face range, face region) of S402, so that the face region is extended.

Since there is a possibility of the face orientation of the subject changing between the previous frame and the current frame or the face position itself changing due to movement, the face region of the previous frame is extended at any magnification to be used for determining the adequacy of the tracking position of the pupil. For Embodiment 1.2 to 1.8 times the magnification is multiplied by the magnitude of face detection, and the face region is set at such an extension magnification as to cover the entire head of the subject so as to be capable of coping with a change in the face orientation or the face position.

In addition, it is preferable that the extension magnification of the face region is set to be low if the movement speed of the subject calculated using any method on the basis of a difference in position from the previous frame or the like is slow, and that the extension magnification of the face region is set to be high if the movement speed is fast. Similarly, the extension magnification of the face region may be set to be low because the amount of movement of the subject on the imaging element 14 is expected to be small if a distance from the subject to the image acquisition unit (subject distance) is long, and the extension magnification of the face region may be set to be high if the subject distance is short.

In addition, depending on the reliability of the face detection result, the extension magnification may be set to be higher as the reliability becomes lower. In addition, the extension magnification may be set depending on the type of subject. For example, the extension magnification is set to be higher in the case of subjects of a type that is more difficult to be discriminated.

In the above method, the system control circuit 50 calculates an expected face region of the current frame, and the process transitions to step S404.

In step S404, it is determined whether the central coordinates of the tracking position of the pupil in the current frame fall within the face region calculated in step S403. If the central coordinates of the tracking position fall outside the range of the face region, the process transitions to step S405. If the central coordinates fall within (inside) the range of the face region, the process transitions to step S406.

In step S405, the system control circuit 50 sets the tracking continuation time of the pupil to be shorter. Basically, the tracking continuation time is set to zero so that the next subject can be tracked immediately, but depending on a distance from the face region to the pupil, it may be set to be shorter as the distance becomes longer. After the end of the setting of the tracking time, the process ends.

Meanwhile, the system control circuit 50 determines whether image capturing is continued during the tracking process. If so, the process transitions to, for example, step S201, and the flows of FIGS. 3 to 5 end when image capturing is completed.

Figure 6:
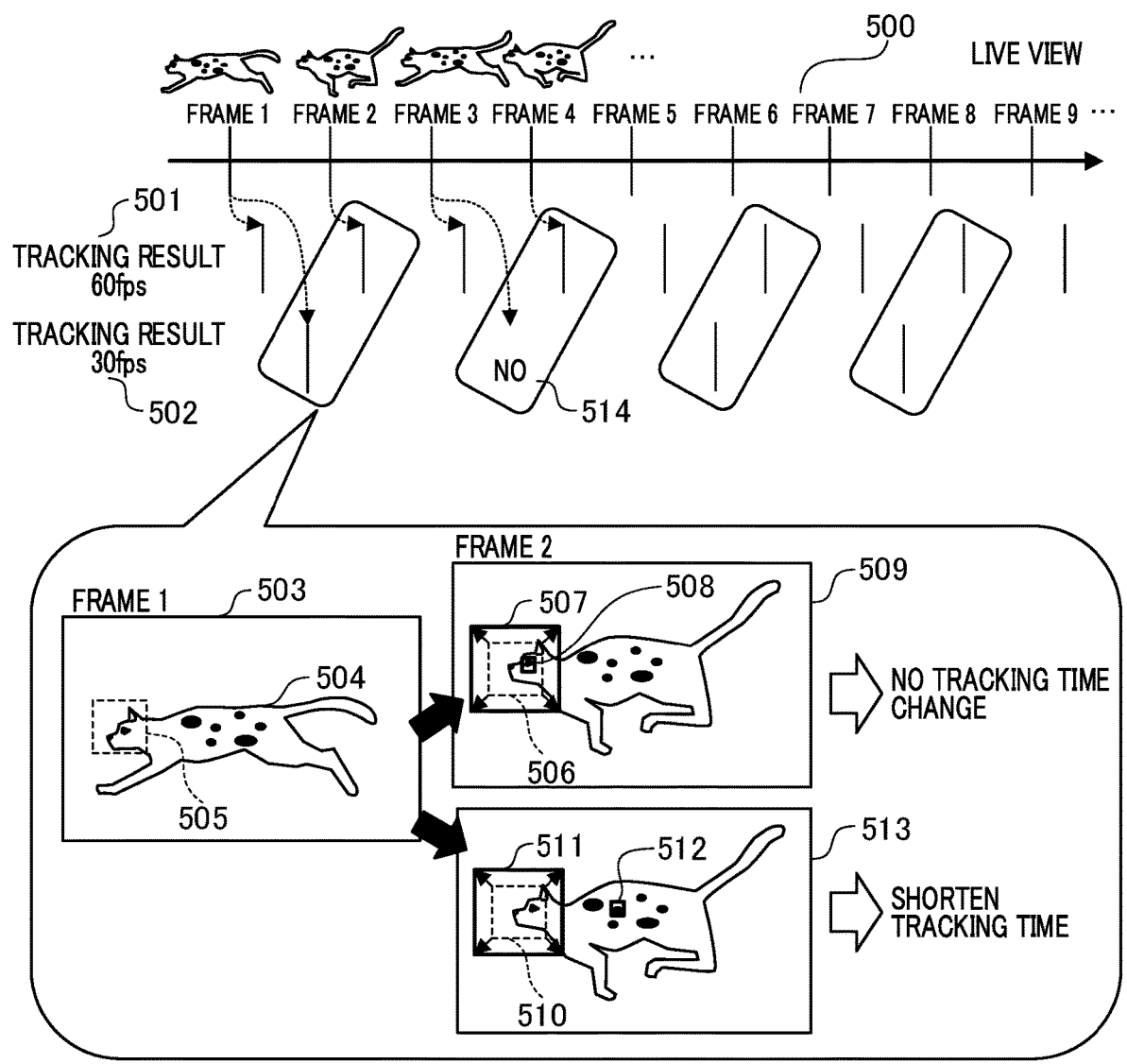
FIG. 6 is a diagram illustrating a method of reducing erroneous pupil tracking using the face detection results of Embodiment 2.

FIG. 6 is a diagram illustrating a method of reducing erroneous pupil tracking using the face detection result of Embodiment 2, and shows operations for the system control circuit 50 to change the tracking continuation time on the basis of the pupil tracking position and the face position of the subject detected from an image proximate thereto.

A frame 501 of a tracking result is output at an interval of 60 fps shifted by a tracking processing time with respect to a frame 500 in live view updated at 60 fps (the number of frames per second). On the other hand, a detection result 502 of a face or the like is output at an interval of 30 fps in order to perform more complicated processing than tracking. Hereafter, a tracking time shortening determination of a pupil tracking frame in a frame 2 will be described as an example.

A face detection range 505 of a subject 504 shown in an image 503 of a frame 1. In the frame 2, an image of a case in which the tracked pupil is within the range of the face region (a case of No in step S404) is shown in 509.

In addition, an image of a case in which the pupil is located outside the range of the face region (a case of Yes in step S404) due to the body pattern of the subject being erroneously tracked as the pupil is shown in 513.

In the image 509, a result obtained by applying the face detection range 505 of the frame 1 to the frame 2 is a face detection range 506, and an extended face region calculated in step S403 of FIG. 5 is 507.

In the image 509, since a tracking pupil position 508 is located inside the face region 507, the tracking position of the pupil is appropriate, and the pupil tracking time does not change.

On the other hand, in the image 513, a result obtained by applying the face detection range 505 of the frame 1 to the frame 2 is 510, and an extended face region calculated in step S403 of FIG. 5 is 511. Since a tracking pupil position 512 is located outside the face region 507, the tracking position of the pupil is inappropriate, and the system control circuit 50 shortens the pupil tracking time (step S405).

If there is no face detection result as in 514 (No in step S402), the position of pupil tracking is used as it is without performing a determination using the extended face region.

That is, in the present Embodiment, if the pupil tracking position goes out of (outside) the range of the (extended) face region, it is possible to reduce erroneous tracking of the subject by setting the tracking continuation time to be short.

In the above description, each unit in the present Embodiment may include a discrete electronic circuit, or some or all of the units may be configured by an FPGA, a CPU, or a computer program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Meanwhile, a computer program for realizing some or all of control in the present Embodiment and functions of the examples described above may be supplied to the imaging device or the like through a network or various storage media. A computer (a CPU, an MPU, or the like) in the imaging device or the like may read out and execute the program. In that case, the program and a storage medium having the program stored therein constitute the present invention.

This application claims the benefit of Japanese Patent Application No. 2020-26409 filed on Feb. 19, 2020, and No. 2020-77284 filed on Apr. 24, 2020, both of which are hereby incorporated by reference herein in its entirety.

What is claimed is:

1. A subject tracking device comprising
at least one processor or circuit configured to function as:
an image acquisition unit configured to sequentially acquire images;
a detection unit configured to detect a type of the subject from the images acquired by the image acquisition unit;
a tracking unit configured to track a subject which is detected by the detection unit;
a control circuit configured to switch to tracking the subject using the tracking unit when the subject that has been detected by the detection unit cannot be detected; and
a setting unit configured to limit a time period for continuing tracking of the subject, by the tracking unit, from a start of the tracking of the subject to a stop of the tracking of the subject, in accordance with the type of the subject detected by the detection unit;
wherein the tracking unit tracks the subject in accordance with the time period for continuing tracking of the subject limited by the setting unit, and
wherein the time for continuing the tracking of a face of a person is made longer than the time for continuing the tracking of a pupil of the person.

2. The subject tracking device according to claim 1, wherein when the subject is a specific subject, the tracking unit performs tracking on the basis of a subject region corresponding to the specific subject detected by the detection unit.

3. The subject tracking device according to claim 2, wherein, in a case that the specific subject becomes undetected by the detection unit in a plurality of images which are sequentially acquired by the image acquisition unit, the tracking unit continues to track the specific subject on the basis of the subject region in an image in which the specific subject can be detected.

4. The subject tracking device according to claim 1, wherein, in a case that a time for continuing the tracking of a predetermined part of the subject has elapsed and an inclusion part including the predetermined part is detected, the inclusion part is tracked.

5. The subject tracking device according to claim 1, wherein the setting unit sets the time for continuing tracking a relatively large part longer than the time for continuing tracking a relatively small part.

6. The subject tracking device according to claim 1, wherein, in a case where a position of a pupil part of the subject is located outside a face region of the subject, the setting unit sets the time for continuing tracking shorter than in a case where the position is located inside the face region of the subject.

7. The subject tracking device according to claim 6, wherein the face region is extended in accordance with at least one of the types of subject, a movement speed of the subject, a reliability of a face detection result, or a distance from the subject to the image acquisition unit.

8. The subject tracking device according to claim 6, wherein the face region is extended at an extension magnification according to the type of subject.

9. The subject tracking device according to claim 6, wherein the face region is extended at an extension magnification according to the movement speed of the subject.

10. The subject tracking device according to claim 6, wherein the face region is extended at an extension magnification according to the distance from the subject to the image acquisition unit.

11. The subject tracking device according to claim 1, wherein the at least one processor or circuit further function as a switching unit configured to switch a subject for tracking by the tracking unit in a case that the time for continuing tracking of the subject has elapsed.

12. The subject tracking device according to claim 1, wherein the time period set by the setting unit for tracking the subject detected from the images decreases as a size of the subject detected decreases, and increases as the size of the subject detected increases.

13. A subject tracking method comprising:
sequentially acquiring images;
detecting a type of the subject from the images acquired by the acquiring;
tracking a subject which is detected by the detecting;
switching to tracking the subject when the subject that has been detected by the detecting cannot be detected; and
limiting a time period for continuing the tracking of the subject in the tracking, from a start of the tracking of the subject to a stop of the tracking of the subject, in accordance with the type of the subject detected by the detecting;

wherein the tracking tracks the subject detected in accordance with the time period for continuing tracking of the subject limited by the limiting, and wherein the time for continuing the tracking of a face of a person is made longer than the time for continuing the tracking of a pupil of the person.

14. A non-transitory computer-readable storage medium configured to store a computer program for a subject tracking device to execute the following steps:

sequentially acquiring images;

detecting a type of the subject from the images acquired by the acquiring;

tracking a subject which is detected by the detecting;

switching to tracking the subject when the subject that has been detected by the detecting cannot be detected; and limiting a time period for continuing the tracking of the subject in the tracking, from a start of the tracking of the subject to a stop of the tracking of the subject, in accordance with the type of the subject detected by the detecting;

wherein the tracking tracks the subject detected in accordance with the time period for continuing tracking of the subject limited by the limiting, and wherein the time for continuing the tracking of a face of a person is made longer than the time for continuing the tracking of a pupil of the person.

15. A subject tracking device comprising at least one processor or circuit configured to function as:

an image acquisition unit configured to sequentially acquire images;

a detection unit configured to detect a type of the subject from the images acquired by the image acquisition unit;

a tracking unit configured to track a subject which is detected by the detection unit;

a control circuit configured to switch to tracking the subject using the tracking unit when the subject that has been detected by the detection unit cannot be detected; and a setting unit configured to limit a time period for continuing tracking of the subject, by the tracking unit, from a start of the tracking of the subject to a stop of the tracking of the subject, in accordance with the type of the subject and one or more parts of the subject detected by the detection unit;

wherein the time for continuing the tracking of a face of a person is made longer than the time for continuing the tracking of a face of an animal.

16. The subject tracking device according to claim 15, wherein the type of animal includes at least one of a dog, a cat, a bird.

17. A subject tracking method comprising:

sequentially acquiring images;

detecting a type of the subject from the images acquired by the acquiring;

tracking a subject which is detected by the detecting;

switching to tracking the subject when the subject that has been detected by the detecting cannot be detected; and limiting a time period for continuing the tracking of the subject in the tracking, from a start of the tracking of the subject to a stop of the tracking of the subject, in accordance with the type of the subject detected by the detecting;

wherein the time for continuing the tracking of a face of a person is made longer than the time for continuing the tracking of a face of an animal.

18. A non-transitory computer-readable storage medium configured to store a computer program for a subject tracking device to execute the following steps:

sequentially acquiring images;

detecting a type of the subject from the images acquired by the acquiring;

tracking a subject which is detected by the detecting;

switching to tracking the subject when the subject that has been detected by the detecting cannot be detected; and limiting a time period for continuing the tracking of the subject in the tracking, from a start of the tracking of the subject to a stop of the tracking of the subject, in accordance with the type of the subject detected by the detecting;

wherein the time for continuing the tracking of a face of a person is made longer than the time for continuing the tracking of a face of an animal.

19. The subject tracking device according to claim 1, wherein the tracking unit searches for a subject region that matches a template temporarily stored in a memory from among images.

20. The subject tracking device according to claim 1, wherein the tracking unit searches for a subject region based on at least one of a histogram and color data.

21. The subject tracking device according to claim 15, wherein the tracking unit searches for a subject region that matches a template temporarily stored in a memory from among images.

22. The subject tracking device according to claim 15, wherein the tracking unit searches for a subject region based on at least one of a histogram and color data.

23. A subject tracking device comprising:

at least one processor or circuit configured to function as:

an image acquisition unit configured to sequentially acquire images;

a detection unit configured to detect a type of the subject from the images acquired by the image acquisition unit;

a tracking unit configured to track a subject which is detected by the detection unit;

a control circuit configured to switch to tracking the subject using the tracking unit when the subject that has been detected by the detection unit cannot be detected; and a setting unit configured to limit a time period for continuing tracking of the subject, by the tracking unit, from a start of the tracking of the subject to a stop of the tracking of the subject, in accordance with the type of the subject detected by the detection unit;

wherein the tracking unit tracks the subject in accordance with the time period for continuing tracking of the subject limited by the setting unit, and wherein the time for continuing the tracking of a face of an animal is made longer than the time for continuing the tracking of a pupil of the animal.

24. The subject tracking device according to claim 23, wherein the type of animal includes at least one of a dog, a cat, and a bird.

25. The subject tracking device according to claim 23, wherein the tracking unit searches for a subject region that matches a template temporarily stored in a memory from among images.

26. The subject tracking device according to claim 23, wherein the tracking unit searches for a subject region based on at least one of a histogram and color data.

27. A subject tracking device comprising
at least one processor or circuit configured to function as:
an image acquisition unit configured to sequentially acquire images;
a detection unit configured to detect a type of the subject from the images acquired by the image acquisition unit;
a tracking unit configured to track a subject which is detected by the detection unit from the images acquired by the image acquisition unit; and
a setting unit configured to limit set a time period for continuing tracking of the subject, by the tracking unit, from a start of the tracking of the subject to a stop of the tracking of the subject, in accordance with the type of the subject detected by the detection unit from the images;
wherein the tracking unit tracks the subject detected by the detection unit from the images in accordance with the time period for continuing tracking of the subject limited set by the setting unit,
wherein the setting unit limits the time period for continuing tracking by the tracking unit in accordance with one or more parts of the subject detected by the detection unit, and
wherein the time period set by the setting unit for tracking the subject detected from the images decreases as a size of the subject detected decreases, and increases as the size of the subject detected increases.

* * * * *